(12) United States Patent
Martin et al.

(10) Patent No.: US 6,281,903 B1
(45) Date of Patent: Aug. 28, 2001

(54) METHODS AND APPARATUS FOR EMBEDDING 2D IMAGE CONTENT INTO 3D MODELS

(75) Inventors: Ioana M Martin, Ossining; Bengt-Olaf Schneider, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/206,031

(22) Filed: Dec. 4, 1998

(51) Int. Cl.$^7$ .................................................. G06F 15/00
(52) U.S. Cl. ............................................................ 345/421
(58) Field of Search .................................... 345/418, 419, 345/420, 421, 426, 427, 113, 114

(56) References Cited

U.S. PATENT DOCUMENTS 5,949,424 * 9/1999 Cabral et al. ......................... 345/426

OTHER PUBLICATIONS

Aliaga, Daniel G. et al., "Architectural Walkthroughs Using Portal Textures", IEEE Visualization, Oct. 19–24, 1997, pp. 355–362.

Aliaga, Daniel G., Visualization of Complex Models Using Dynamic Texture–based Simplification, IEEE Visualization Oct. 27–Nov. 1, 1996, pp. 101–106.

Chen, Shenchang Eric, "QuickTime VR–An Image–Based Approach to Virtual Environment Navigation", Siggraph, Aug. 6–11, 1995, pp. 29–38.

Memon, Nasir et al., "Protecting Digital Media Content", Communications Of The ACM, Jul. 1998, vol. 41, No. 7, pp. 35–43.

Ohbuchi, Ryutarou et al., "Watermarking Three–Dimensional Polygonal Models Through Geometric and Topological Modifications", IEEE, vol. 16, No. 4, 5/98, pp. 551–560.

Schneider, B. et al., "An Adaptive Framework for 3D Graphics in Networked and Mobile Environments", Interactive Appl. Of Mobile Computing, Nov. 25, 1998, pp. 1–7.

Debevec, Paul E. et al., "Modeling and Rendering Architecture from Photographs: A hybrid geometry– and image–based approach", Siggraph, Aug. 4–9, 1996, pp. 11–20.

Luken, William L. et al., "Panoram IX, Photorealistic Multimedia 3D Scenery", Computer Science/Mathematics RC21145(94534) Apr. 21, 1998, pp. 1–14.

Mintzer, Fred et al., "Effective and Ineffective Digital Watermarks", Computer Science/Mathematics RC20933(92686) Jul. 24, 1997, 4 pages.

Schaufler, Gernot, "Per–Object Image Warping with Layered Impostors", Proceedings of the 9$^{th}$ Eurographics Workshop on Rendering, 1998, 12 pages.*

Schneider, B. et al., "Extending VRML to Support Panoramic Images", available on WWW 1996, 9 pages.*

* cited by examiner

Primary Examiner—Phu K. Nguyen
(74) Attorney, Agent, or Firm—Douglas W. Cameron; Perman & Green, LLP

(57) ABSTRACT

A method and apparatus for combining two dimensional (2D) images with three dimensional (3D) polygonal models of objects so as to encode 2D image content information into the 3D objects, thereby providing an efficient rendering and transmission of complex scenes. The occurrence of an occlusion error in a digital data processing system that has a display is avoided. The method has steps of (a) encoding a specification of a two dimensional background image into at least one three dimensional foreground object that overlies and occludes a portion of the background image; and (b) displaying to a viewer the background image and the at least one overlying foreground object. A further step operates in response to a movement of the foreground object that makes a portion of the background image visible to the viewer, for (c) displaying the portion of the background image that has become visible. The step of displaying uses the encoded specification that is retrieved from the foreground object. For example, the step of encoding can store color-related data into unused portions of an indexed list of vertices that are descriptive of the foreground object.

42 Claims, 12 Drawing Sheets

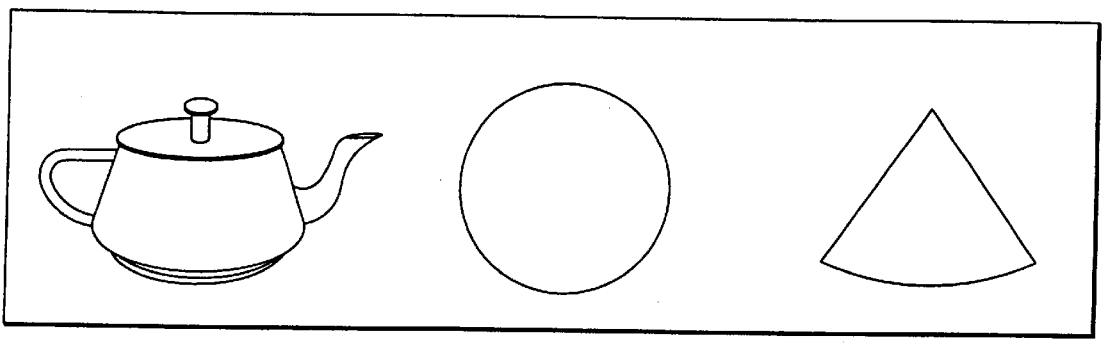
FIG.1A
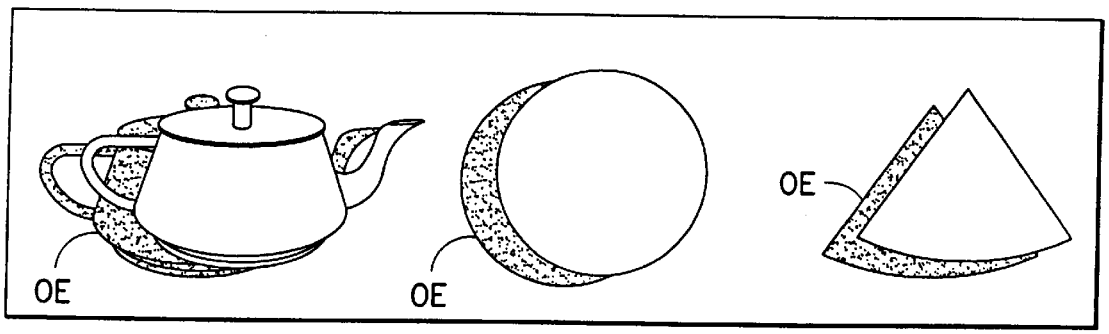
FIG.1B
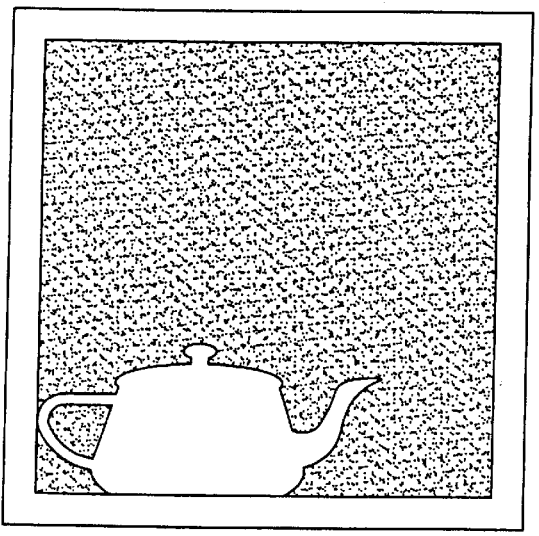 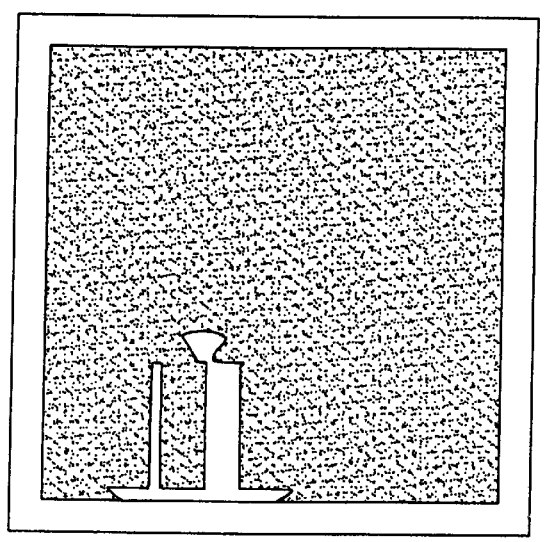
FIG.3A              FIG.3B

QUADTREE DESCRIPTOR: 1 0001 111 0000 1111
LENGTH OF QUADTREE DESCRIPTOR: 16 BITS

COLOR TABLE:

| | | |
|---|---|---|
| 0 | 167 | = 10100111 |
| 1 | 101 | = 01100101 |
| 2 | 58 | = 00111010 |
| 3 | 23 | = 00010111 |
| 4 | 202 | = 11001010 |
| 5 | 250 | = 11111010 |

COLOR TABLE LENGTH: 6 COLORS
COLORS IN QUADTREE LEAVES: 4, 5, 0, 3, 0, 1, 2

| VERTEX INDEX | BIT PATTERN | BIT PATTERN AFTER EMBEDDING | COMMENT |
|---|---|---|---|
| 0 | 0000 0000 0000 0000 | 1000 1000 0000 0000 | DESCRIPTOR LENGTH |
| 1 | 0000 0000 0000 0001 | 1100 0111 1000 0001 | DESCRIPTOR |
| 2 | 0000 0000 0000 0010 | 1000 0111 1000 0010 | DESCRIPTOR (CONT'D) |
| 0 | 0000 0000 0000 0000 | 1000 0011 0000 0000 | COLOR TABLE LENGTH |
| 2 | 0000 0000 0000 0010 | 1101 0011 1000 0010 | COLOR #0 |
| 3 | 0000 0000 0000 0011 | 1011 0010 1000 0011 | COLOR #1 |
| ⋮ | | | ⋮ |

INDEXED FACE LIST:

FACE #1: 0, 1, 2
FACE #2: 0, 2, 3
FACE #3: 4, 2, 1
FACE #4: 4, 3, 2
⋯

BIT PATTERN: 3 = 0000 0011

OBJECT 1 COVERS OBJECT 2
(PARTIAL OCCLUSION)

MASK M OF OBJECT 2

QUADTREE QI
CORRESPONDING TO OBJECT 1

MASK M1 ENLARGED TO INCLUDE
ALL CELLS (LEAVES) OF Q1
THAT INTERSECT M

OBJECT MASK

VALID LEAF

QUADTREE

INVALID LEAF

METHODS AND APPARATUS FOR EMBEDDING 2D IMAGE CONTENT INTO 3D MODELS

FIELD OF THE INVENTION

This invention relates generally to graphics processing and display systems and, in particular, to those capable of rendering together for display two dimensional (2D) scene images and three dimensional (3D) objects.

BACKGROUND OF THE INVENTION

The continually increasing complexity of polygonal models for computer display applications has tended to outpace the advances made in hardware technology. As such, the rendering of complex polygonal models, at interactive rates, remains a challenging task. The various techniques developed to address this problem can be classified into three main categories; geometry-based, image-based, and hybrid.

The hybrid method combines the use of three dimensional geometric modeling with two dimensional images in an attempt to draw on the strengths of both the geometry-based and image-based categories. The underlying strategy is to render those parts of the model close to the viewer as geometry, i.e., as a three dimensional (3D) model, and to render more distant visible parts as two dimensional (2D) images. Such schemes offer the advantage of increased performance in cases where geometry-based simplification techniques (e.g., visibility culling) break down, and the rendering time is proportional to the size of the nearby geometry and the number of images used. Moreover, the amount of storage required is considerably reduced as compared to image-based methods. Hybrid techniques are also well suited to the transmission of large models over networks.

To avoid long delays between the time of a request and the subsequent display of the model, adaptive techniques that combine different transmission methods have been proposed. For example, to deliver a 3D scene from a server to a client, a panoramic image of the scene could be transmitted first to provide the client with a quick view of the model. Subsequently, 3D geometric objects are transmitted to progressively replace parts of the panorama as they are received by the client.

One significant problem to be addressed when implementing algorithms that combine images with geometry are so-called 'occlusion errors'. Occlusion errors occur when previously hidden areas of an image become visible, as objects in the scene move. For example, contrast FIG. 1A to FIG. 1B, and note the existence of the occlusion errors (OEs) in FIG. 1B due to the movement of the objects to the right in the drawing. The occurrence of occlusion errors is objectionable to most users, and can seriously degrade a desired illusion of realism being conveyed by a displayed scene and object(s).

In order to deal with these occlusion errors several strategies have been proposed. A first strategy is based on the use of a "neutral" fill color, while a second strategy is based on an interpolation of the colors of the pixels that surround the occlusion error. A discussion of both of these strategies can be found in a publication by Bengt-Olaf Schneider and Linus Vepstas, Extending VRML to Support Panoramic Images. A third strategy is based on the use of multiple layer images, as proposed by Schaufler et al., Per-Object Image Warping with Layered Impostors, Proceedings of the 9$^{th}$ Eurographics Workshop on Rendering, 1998.

Unfortunately, these various strategies typically either yield very rough approximations of the scene behind the objects that have moved, or require a considerable amount of additional storage and non-trivial computation to fill in the gaps resulting from the occlusion errors.

It will become apparent below that a capability to embed data into a 3D geometric object is an important aspect of this invention. It is thus made of record that various techniques for data embedding have been previously investigated for still images, video and audio data, texts, and 3D geometric models. Reference in this regard can be had to: Mintzer et al., Effective and Ineffective Digital Watermarks, Proceedings 1997 International Conference on Image Processing, pp.9–12, 1997; and Memon et al., Protecting Digital Media Content, Communications of the ACM, 41(7), pp. 35–43, 1998.

In the case of 3D models, the annotations of scene description formats such a Virtual Reality Modeling Language (VRML) have been the primary means for adding such information (see Carey et al., The Annotated VRML 2.0 Reference Manual, Addison Wesley, 1997.) More recently, techniques for embedding watermarks into the geometry of models have been proposed by Ohbuchi et al., Watermarking Three Dimensional Polygonal Models Through Geometric and Topological Modifications, Journal of Selected Areas in Communications, 16(4), pp. 551–560, 1998.

However, these known data embedding techniques are generally limited to the encoding of relatively small amounts of information, mainly text, into objects, and are primarily targeted towards security applications, such as copyright protection, theft deterrence, and inventories. In other words, these conventional data embedding techniques do not suggest or provide a solution to the occlusion problem.

OBJECTS AND ADVANTAGES OF THE INVENTION

It is a first object and advantage of this invention to provide an efficient and effective solution to the occlusion problem, and with little or no additional storage cost or computational complexity.

It is a further object and advantage of this invention to provide a technique to encode content information from hidden parts of a scene into visible parts of the scene, and to subsequently retrieve the encoded content information as an arrangement of objects in the visible part of the scene change their spatial relationship relative to the background of the scene, thereby enabling the previously hidden part of the scene to be rendered and thus avoiding the occurrence of an occlusion error or errors.

It is another object and advantage of this invention to provide a technique to encode a specification of a two dimensional background image into a foreground three dimensional geometric object (which could be a polygonal object, or one defined in some other way), and to subsequently retrieve the encoded specification and then render the background image in response to a movement of the foreground object relative to the background scene, thereby avoiding the occurrence of an occlusion error.

SUMMARY OF THE INVENTION

The foregoing and other problems are overcome and the objects of the invention are realized by methods and apparatus in accordance with embodiments of this invention, wherein there is provided a method and apparatus for combining two dimensional (2D) images with three dimensional (3D) polygonal models of objects so as to encode image content information into the 3D objects for efficient rendering and transmission of complex scenes.

In a method for avoiding an occurrence of an occlusion error in a digital data processing system that comprises a display, this invention teaches steps of (a) encoding a specification of a two dimensional background image into at least one three dimensional foreground object that overlies and occludes a portion of the background image; (b) displaying to a viewer the background image and the at least one overlying foreground object; and, in response to a movement of the foreground object that makes a portion of the background image visible to the viewer, (c) displaying the portion of the background image that has become visible. The step of displaying uses the encoded specification that is retrieved from the foreground object.

The three dimensional foreground object is defined using polygons, each having vertices, edges and faces. A polygonal model, or one based on, for example, patches or splines could be used. The step of encoding encodes data from the background image that is comprised of color data and, optionally, depth data that is descriptive of occluded pixels.

The step of encoding could occur at a first data processor (e.g., a server), and the steps of displaying could occur at a second data processor (e.g., a client). In this case the server and client can be coupled together through a data communications network.

For example, and for a case where there are a plurality of three dimensional foreground objects, the step of encoding includes an initial step of transmitting first data from the server to the client, where the first data is the two dimensional background image as well as a two dimensional representation of the plurality of three dimensional foreground objects.

For example, the method can include an initial step of transmitting from a first node to at least one second node the two dimensional background image and a two dimensional representation of the at least one foreground object, and then subsequently transmitting from the first node to the at least one second node the at least one three dimensional foreground object containing the encoded specification.

In a first embodiment the step of encoding then further encodes, in turn, the specification of the two dimensional background image into an individual one of the three dimensional foreground objects that overlies and occludes a portion of the background image, and then transmits second data from the server to the client. In this embodiment the second data is the individual one of the three dimensional foreground objects having the encoded specification of the two dimensional background image.

In a second embodiment the step of encoding then further encodes the specification of the two dimensional background image into all of the plurality of three dimensional foreground objects that overlie and occlude a portion of the background image, and then transmits second data from the server to the client. In this second embodiment the second data includes all of the plurality of three dimensional foreground objects having the encoded specification of the two dimensional background image.

The step of encoding includes steps of applying a mask to the two dimensional background image and sampling, using a quadtree structure in the preferred embodiment, the two dimensional background image within the mask to obtain sampled image data.

To eliminate an occurrence of "seams" when multiple objects overlap the background image, the mask has a shape that corresponds to a shape of a first object mask M and also all quadtree cells, that project onto M, and that are associated with quadtrees corresponding to other three dimensional foreground objects that also project onto the same region of the two dimensional background image.

A further step of the method then stores the sampled image data into unused portions of a data structure, such as an indexed list of vertices, that is descriptive of the three dimensional foreground object. For example, one byte of a multi-byte vertex index is used to store sampled image data, and a logical state of a sign bit is used to indicate that the associated vertex index stores sampled image data. Using this technique a color table can be stored into the three dimensional foreground object, as well as indices into the color table corresponding to the sample image data.

The step of displaying the background image and the at least one overlying foreground object preferably includes preliminary steps of (i) stripping the encoded specification from the foreground object and rendering the two dimensional background image in its entirety; (ii) storing the rendered background image; and, in response to the movement of the foreground object that makes a portion of the background image visible to a viewer, the step of displaying the portion of the background image that has become visible (iii) accesses the stored background image to retrieve that portion of the background image that has become visible.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 including FIGS. 1A–1B is illustrative of occlusion errors, where FIG. 1A is an image of a scene consisting of three objects in front of a textured wall, and where FIG. 1B shows that, as the objects move, parts of the wall previously hidden by the objects are revealed causing occlusion errors (OE, shown in black).

FIG. 3 including FIGS. 3A–3C shows examples of image preprocessing, where FIG. 3A is an example of masking where a mask bitmap is produced by invalidating all pixels in the region that are outside of a sampling area; and where FIG. 3B is an example of edge detection. The thresholding of edges within the sampling area identify regions of high detail. Adaptive sampling is used to sample areas of high gradient more densely than relatively uniform areas, and Sobel filtering is followed by thresholding to completely flatten regions that are relatively uniform. FIG. 3C depicts exemplary Sobel operator filters used to compute the gradient of the sampling region.

FIG. 4 including FIGS. 4A–4D is an example of encoding, where FIG. 4A presents an exemplary guadtree structure that guides the sampling process, FIG. 4B shows the order in which quadtree cells are considered for processing, FIG. 4C shows one exemplary format of information about the image that is encoded into the geometric object, and FIG. 4D illustrates an example of the actual encoding, where the least significant byte of each vertex index is used to encode the information about the image behind the object, the sign bit is set to 1 to indicate that the vertex index contains embedded information, the following eight bits contain the embedded information, and the last seven bits represent the value of the vertex index and are not modified.

FIG. 6 depicts an exemplary set of vertices defining faces, and the associated indexed face list.

DETAILED DESCRIPTION OF THE INVENTION

Figure 9A:
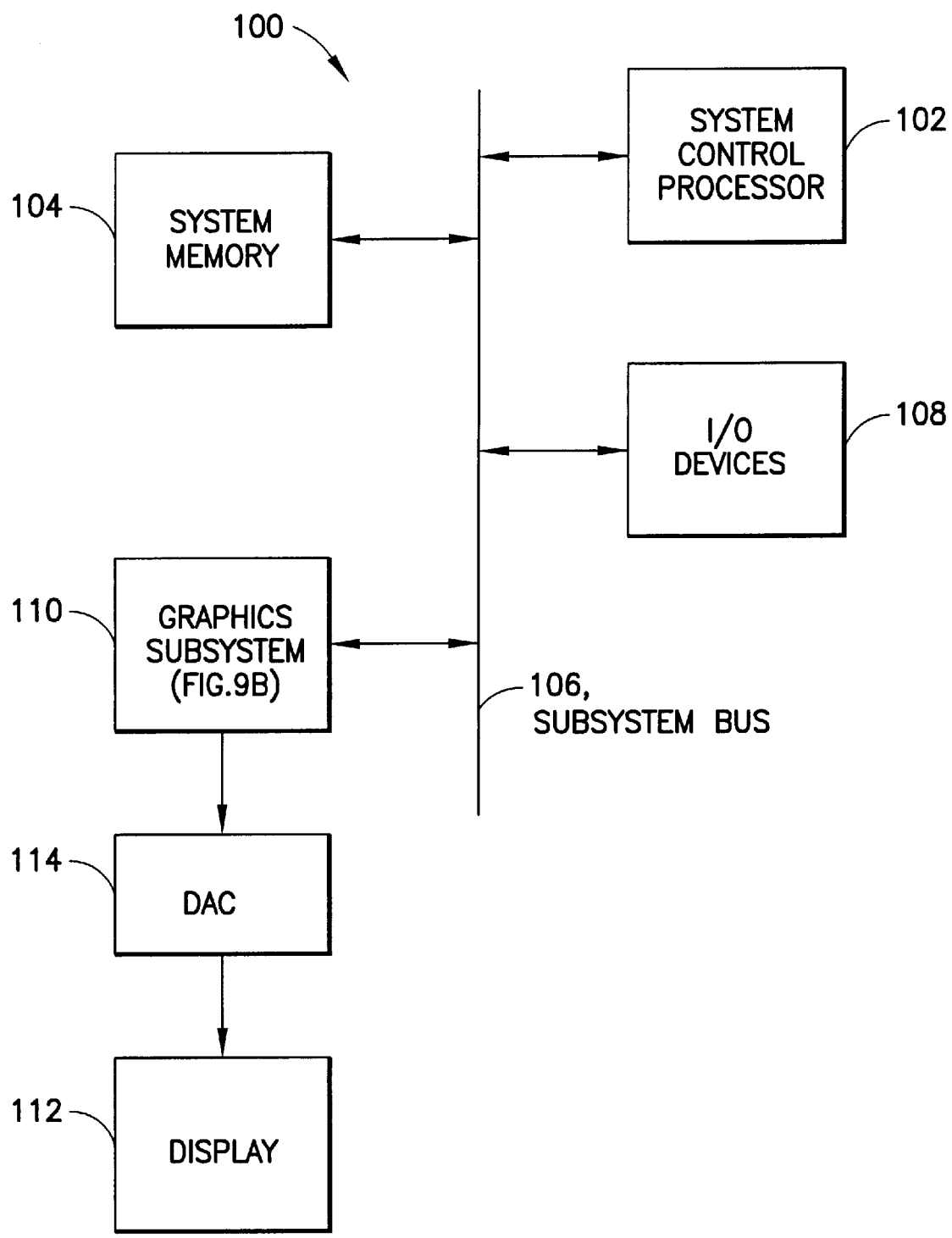
FIG. 9A is a block diagram of an embodiment of a graphics processing system that is suitable for practicing this invention.

Reference is first made to FIG. 9A illustrating the overall architecture of an exemplary graphics processing system 100 that is suitable for practicing this invention. The graphics processing system 100 includes a system control processor 102 which is coupled to a system memory 104 via a system bus 106. The system memory 104 includes random access memory (RAM) that stores graphics data defining objects contained in one or more three dimensional models/views. The system memory 104 also stores an application program running on the system control processor 102 that provides a user-interface to navigate through and/or modify the three-dimensional models/views defined by the graphics data stored in the memory 104. The graphics data that define each object include coordinates and attributes (e.g. color) of primitives. The primitives are geometric entities such as a solid, line, or surface. Typically, the primitives are triangles defined by three vertices. In this case, the system memory 104 includes an ordered list of vertices for triangles that define the surfaces of objects that make up a three dimensional view. In addition, the system memory 104 may store a list of primitive identifiers that correspond to each of the primitives, and transformation matrices that specify how and where the primitives are to be displayed. Input/output (I/O) devices 108 interface to the system control processor 102 via the system bus 106. The I/O devices 108 may include one or more of a keyboard, template, or touch pad for text entry, a pointing device such as a mouse, trackball, or light pen for user input, and speech recognition for speech input.

The graphics processing system 100 also includes a graphics subsystem 110 that interfaces to the system memory 104 via the system bus 106. The graphics subsystem 110 is of most interest to the teachings of this invention, and is shown in greater detail in FIG. 9B. Generally, the graphics subsystem 110 operates under command from the application program to render the graphics data stored in the system memory 104 for display as an array of pixels in a display area of a display device 112. The display device 112 may utilize raster scan techniques or liquid crystal display techniques to display the pixels. The pixel data generated by the graphics subsystem 110 is in digital form and, typically, the display device 112 requires the pixel data in analog form. In this case, a digital-to-analog converter (DAC) 114 can be placed between the graphics subsystem 110 and the display device 112 to convert the pixel data from the digital to the analog form that is suitable for driving the display device 112.

Figure 9B:
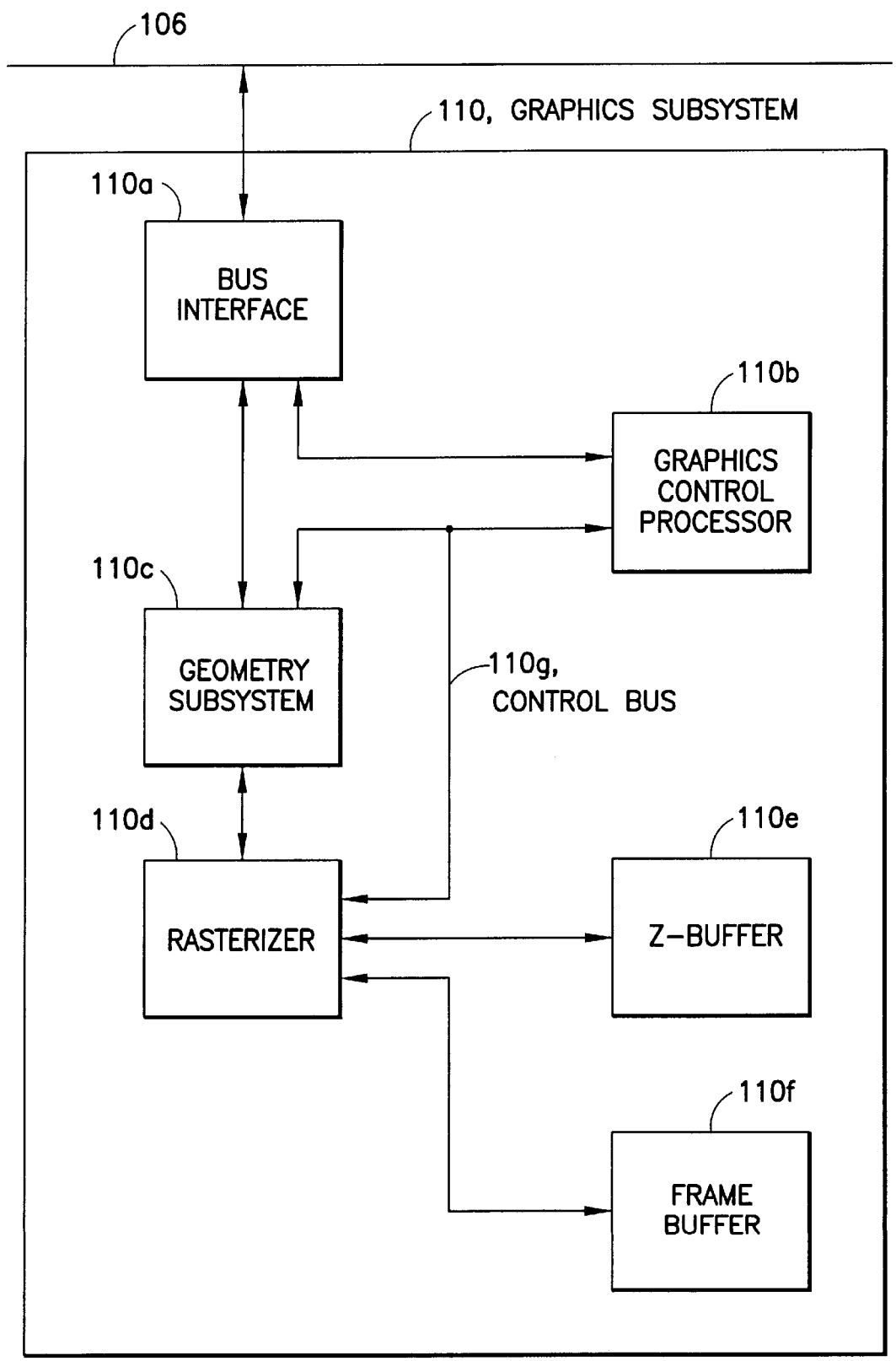
FIG. 9B shows in greater detail the constriction of the graphics subsystem block of FIG. 9A.

Referring to FIG. 9B, the graphics subsystem 110 includes a control unit or graphics control processor 110b that supervises the operation of the graphics subsystem 110. Upon receiving a graphics order to render a scene, the control unit or graphics control processor 110b passes the graphics data associated with the graphics order on to a rendering engine or geometry subsystem 110c. The rendering engine 110c transforms the graphics data associated with the graphics order from the model coordinate system to a view coordinate system and clips the graphics data against a predetermined view volume. In addition, depending upon the shading algorithm to be applied, an illumination model is evaluated at various locations (i.e., the vertices of the primitives and/or the pixels covered by a given primitive). The transformed and clipped graphics data is then passed on to a rasterization stage 110d that converts the transformed primitives into pixels, and generally stores each primitive's contribution at each pixel. The rendering engine 110c may be organized in a variety of architectures. A more detailed discussion of such architectures may be found in Foley et. al., "Computer Graphics: Principles and Practice", Addison-Wesley, pp. 855–920 (2nd Ed. 1990).

As is conventional, a frame buffer 110f stores pixel data that represents the color for each pixel of the display device 112 of FIG. 3. The pixel data is periodically output from the frame buffer 110f for display on the display device 112. Preferably, the frame buffer 110f is arranged as a matrix of rows and columns each n bits deep. The particular row and column address typically corresponds to a pixel location in the display area of the display device 112. For example, the (row,column) address of (0,1) may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in a Z-buffer 110e represent the depth of the object visible at that pixel.

The graphics subsystem 110 may include two frame buffers, wherein one of the frame buffers serves as the active display portion, while the other frame buffer is updated for subsequent display. Either frame buffer may change from being active to inactive in accordance with the needs of the system 100, however the particular manner in which the changeover is accomplished is not relevant to the present invention.

Moreover, if the organization of the frame buffer 110f does not correspond to the display area of the display device 112, a scaling operation can be performed on the pixel values stored in the frame buffer 110f, thereby shrinking or enlarging the image stored in the frame buffer. Scaling up may be obtained by duplicating pixel color values or by performing linear or bilinear interpolations between color values to fill gaps between the original pixel values stored in the frame buffer 110f. Scaling down may be obtained by averaging color values of adjacent pixels.

In a presently preferred embodiment the graphics subsystem 110 is constructed and operated in accordance with the teachings of this invention so as to be responsive to each object in a scene that is to be rendered as geometry for sampling the background image behind the object, and for then encoding the samples of the background image into the object, as will now be described in detail.

It is first noted that while applications may have specific requirements for embedding image content into 3D object representations, the following three desirable properties comprise a set of general requirements that should be satisfied in order to achieve a successful embedding.

(a) Unobtrusive: adding information to objects in the scene must not interfere with the structure and appearance of these objects. Their features should be fully preserved by the embedding procedure.

(b) Invertible: the embedding process should be reversible to allow for easy retrieval of the embedded information. This implies the existence of a mechanism to recognize whether external information has been recorded into the representation of an object or not, and the means to extract that information from the object.

(c) Space-efficient: the embedding scheme should allow for a non-trivial amount of information to be stored into the 3D objects.

A 3D scene may contain objects represented in many different ways and having various attributes. For example, some objects may be described by equations, while others are described by sets of polygons, while yet others have predefined shapes, such as spheres, cylinders, or cones. In the ensuing description the inventors intentionally limit the description to polygonal models, i.e., scenes consisting of objects that are described as polygonal surfaces. However, it will be made apparent that the methods described below can, in principle, be applied to other classes of objects, once they are tesselated for rendering purposes.

Figures 4D, 6:
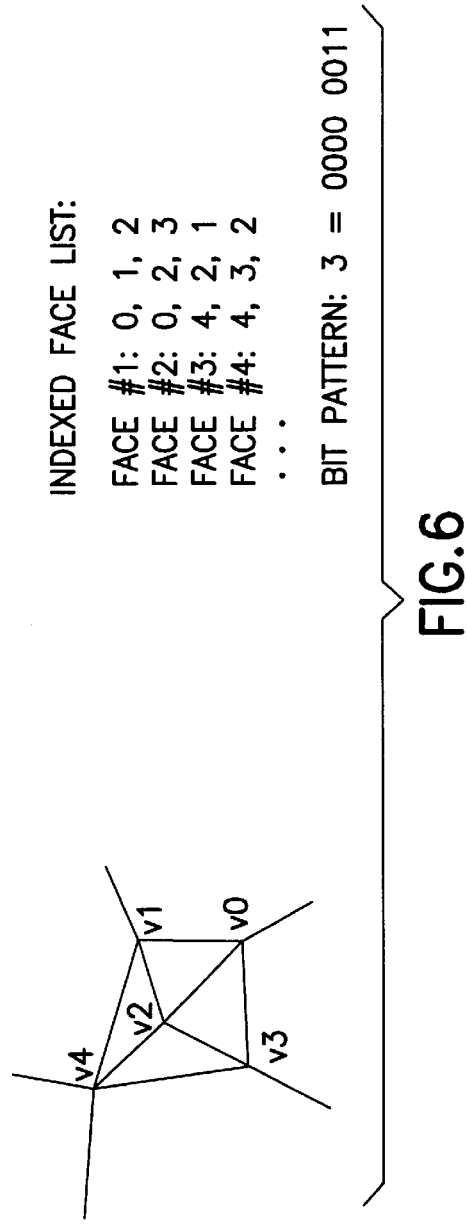

Polygonal models are most commonly represented using polygonal meshes. A polygon mesh is a collection of edges, vertices, and polygons, as described by, for example, Foley et al., Computer Graphics, Principles and Practice, Addison-Wesley, 1992. As is shown in FIG. 6, vertices (v) are connected by edges and define faces of polygons. In general, polygons can be thought of as sequences of edges or vertices.

Several representations have been proposed for polygonal meshes, and applications select among these representations according to various criteria, such as: amount of storage required, ease of identifying edges incident to a vertex, ease of identifying polygons sharing an edge, display performance, ease of defining error metrics, etc. Examples include "explicit polygons", in which each polygon is represented by a list of vertex coordinates, "indexed face lists", in which each vertex in the polygon mesh is stored just once and polygons are defined by lists of indices into the vertex list (see again FIG. 6), and "explicit edges", in which vertices and edges are stored into separate lists, and polygons are defined as sequences of indices in the edge list. One common feature of these and other representations is that for objects with a large number of vertices, there is a considerable amount of unused space that is allocated for their representation.

For example, consider an object with more than 256 vertices represented as an indexed face list. In this case at least two bytes of storage are necessary to represent each vertex index, while for vertices 0–255 at least one of these bytes will be unused, i.e., will always only contain zeros. If one also considers that, on average, a particular vertex index may appear twice in the face list, then one obtains approximately 256×2=512 unused bytes in this exemplary two byte representation.

The inventors have realized, and then exploited, the fact that these normally unused bytes could be used to store information about those parts of the scene that are hidden behind the object to which the unused vertices are associated.

In the previous example, the indices of the vertices have been selected as the embedding targets. However, it should be appreciated that other targets may be exploited as well, such as vertex coordinates, vertex normal coordinates, normal indices, vertex color components, texture coordinates, texture images, etc. However, the geometric and topological primitives are presently preferred as the targets for embedding, since they are the most general and also most likely to be present in the majority of representations of interest.

As was noted previously, the rationale for combining 3D objects with 2D images derives from those applications that require manipulation of large scenes at interactive rates. Examples of such applications are numerous in various fields, ranging from architectural walkthroughs, to scientific visualizations, to the progressive downloading of scenes over slow communication links.

As was also noted above, when geometric objects are combined with images to render scenes, occlusion errors result as the objects move. Typically, areas previously covered by the objects are exposed and appear as holes in the resulting image, as is shown in FIGS. 1A and 1B. Note in FIG. 1B the occurrence of the occlusion errors (OE) next to the three objects as the three objects move to the right relative to the 2D background image.

Several proposed strategies were discussed above for dealing with the occlusion problem. However, it was shown that these strategies either result in only rough approximations of the desired background image, or are expensive in one or both of storage requirements and processing complexity. This invention overcomes these problems by retrieving relevant image features and encoding them into the geometry of the moving objects. Image features of interest typically include pixel intensities (i.e., colors), however depth information (for correctly combining objects and images) and overlay masks (to demarcate regions that are associated with actions) may also be encoded. overlay masks are discussed in the above referenced publication by Luken et al., PanoramIX: Photorealistic Multimedia 3D Scenery, IBM Research Report #RC21145, 1998.

A method in accordance with this invention takes as its input a 3D scene to be rendered. Initially, the entire scene is rendered and displayed as an image. Then, depending on certain conditions, such as the location of the viewpoint or user input, parts of the scene are rendered as 3D geometric objects. These 3D objects will hide other portions of the scene. In order to avoid the occlusion problems described earlier, the obscured portions of the underlying scene are compressed and embedded into the overlying 3D objects. In general, the following steps are executed to produce an embedded representation.

Figure 10:
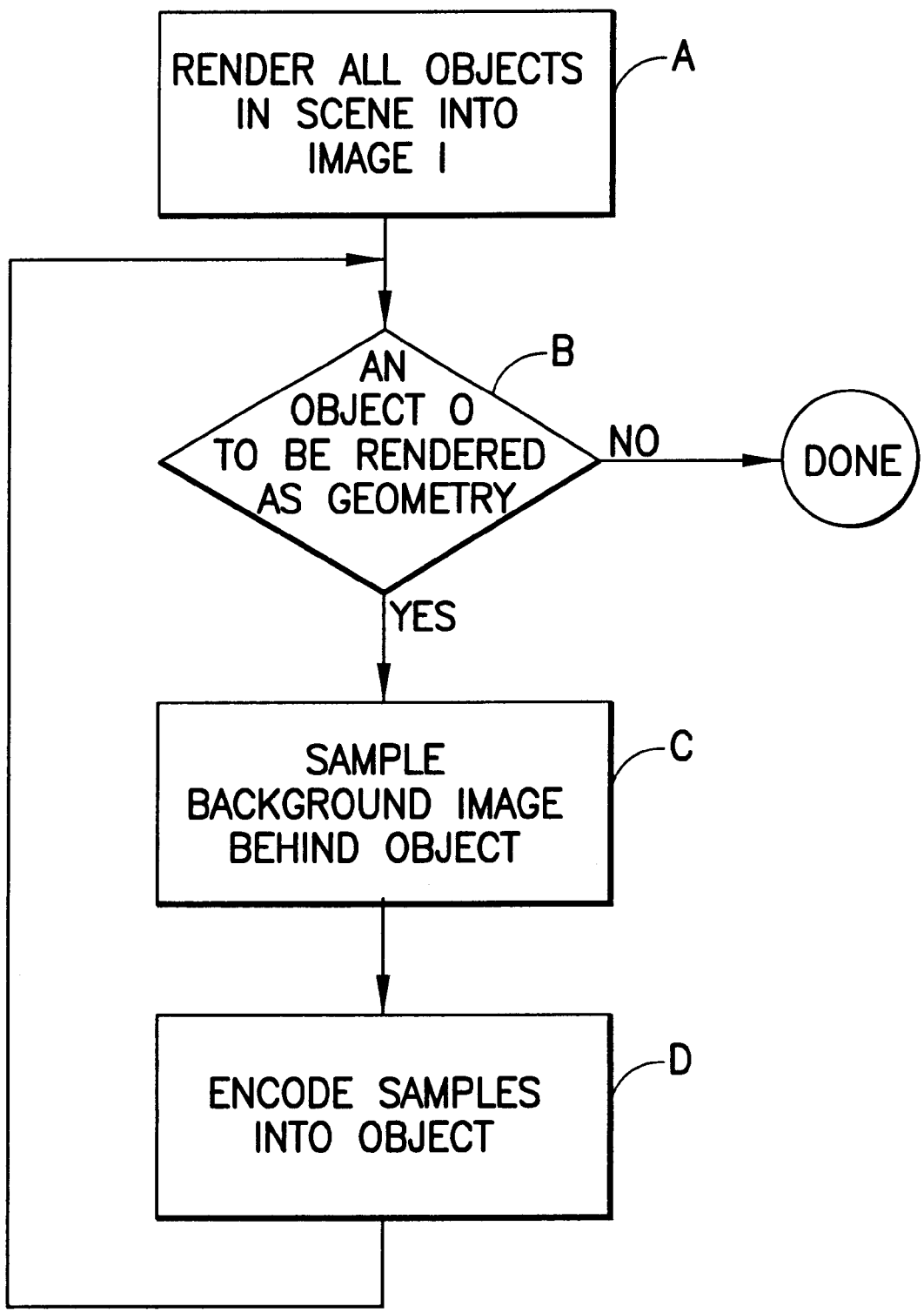
FIG. 10 is a logic flow diagram of a method in accordance with this invention.

Reference should also be had to the logic flow diagram of FIG. 10.

(Step A) Render all objects in the entire scene into an image I.

(Step B) For each object O in the scene to be rendered as geometry do:

(Step C) Sample the background image behind O.

(Step D) Encode the samples into O.

Depending on the application, the implementation of these steps may vary. By example, in a parallel processing embodiment Steps C and D may be done in parallel for two or more objects to be rendered as geometry if the object sampling regions do not overlap. In this context, an object 'to be rendered as geometry' is assumed to be an object that is to be rendered as a polygonal 3D geometric model, as opposed to the background scene which may be a simple 2D image of pixels of varying colors or shades of gray. It should be noted that the original object need not be a polygonal model, but could be represented with some other representation. However, once the object is tesselated and becomes polygonal, then the teachings of this invention can be used.

Two scenarios are now described that illustrate two different techniques for implementing the embedding procedure in the context of transmitting a 3D scene from a server to a client. It should be understood, however, that methods for encoding image content into 3D objects are not limited to either of these techniques, or more generally are not limited to only the transmission of data between servers and clients.

In the first technique, the scene is progressively transmitted from a server to a client. An image of the entire scene is sent first, enabling the client to provide a quick display. The geometric objects follow and progressively replace parts of the image on the display of the client, until the entire geometric representation of the scene is recovered. In this case, and referring to FIG. 11, the procedure for embedding information into objects is follows.

(Step A) Render all objects in the entire scene into an image I on the server.

(Step B) Transmit I to the client.

(Step C) While there is a geometric object O, do the following.

(Step D) Ignoring O, re-render on the server the part of I that is occluded by O. Let this area be the background image B.

(Step E) Compress B and encode it into O.

(Step G) Transmit O (which embeds the compressed B) to the client.

Figure 12:
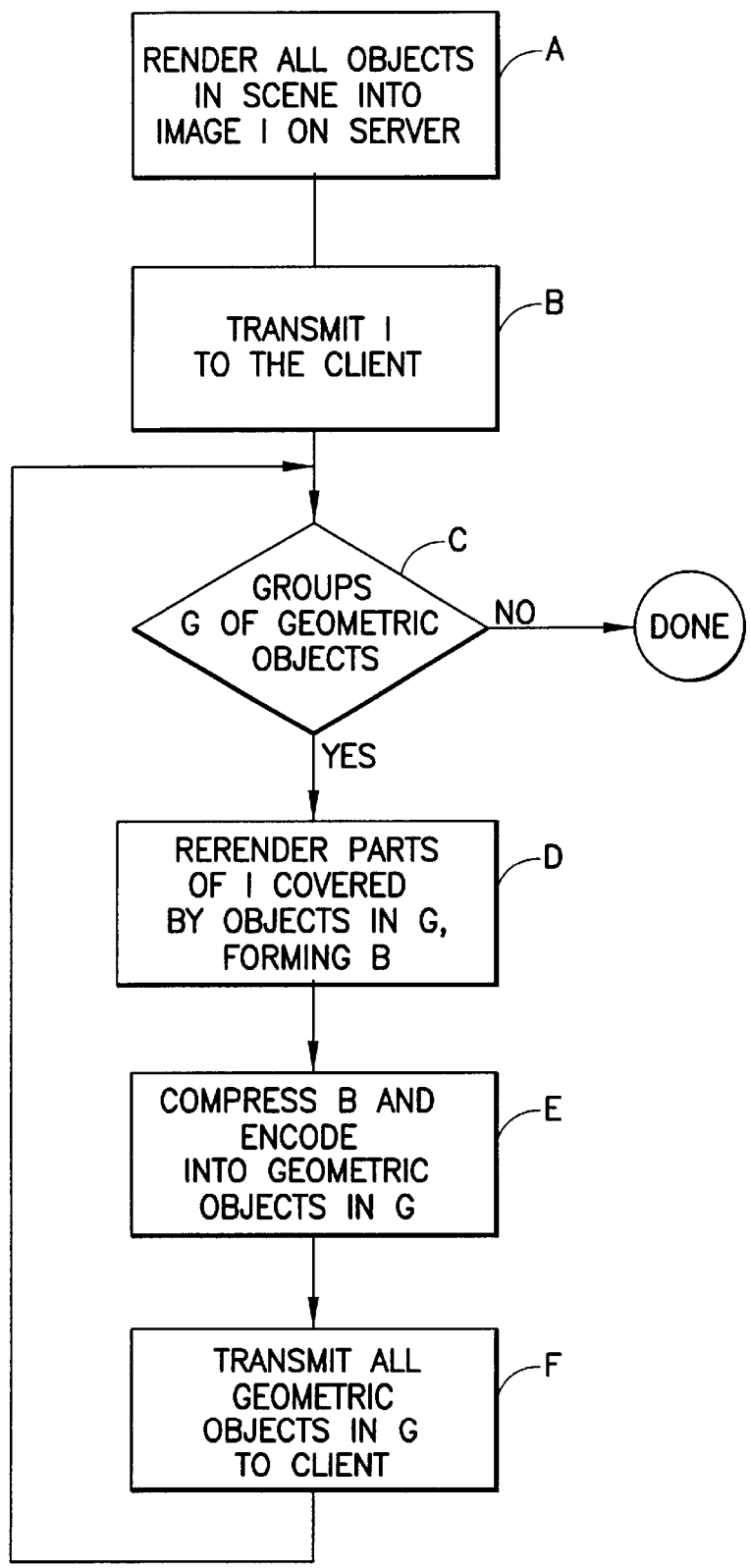

The second technique is similar to the one just described, except that the initial transmission of the image to the client is followed by the transmission of the geometric objects (i.e., all geometric objects are sent at once, as opposed to sending them progressively, one at a time) and the final scene that is rendered on the client is a hybrid scene, containing both images (2D) and geometry (3D). In FIG. 12, this procedure is performed as follows.

(Step A) Render all objects in the entire scene into an image I on the server.

(Step B) Transmit I to the client.

(Step C) While there are groups G of geometric objects do the following.

(Step D) Ignoring all objects in G, re-render on the server those parts of I that are covered by the objects in G. Let these parts form the background image B.

(Step E) Compress B and encode it into the geometric objects in G.

(Step F) Transmit the geometric objects in G (which embed the compressed B) to the client.

With regard to this embodiment it should be realized that the background B is the union of all pixels covered by the objects in G. For example, if several objects lie behind the same pixel, the background behind these objects needs to be encoded only once. This makes the method more space efficient (but at the cost of a longer time to transmit several objects.)

After the client receives the geometric objects, they can be manipulated using various types of known transformations. As the objects move, previously hidden portions of the scene may become visible. In accordance with an aspect of this invention, the attributes (e.g., color, depth) of the image in these areas are retrieved from the information embedded into the previously encoded geometric objects, thereby enabling the previously hidden portions of the scene to be rendered and faithfully displayed.

Figure 11:
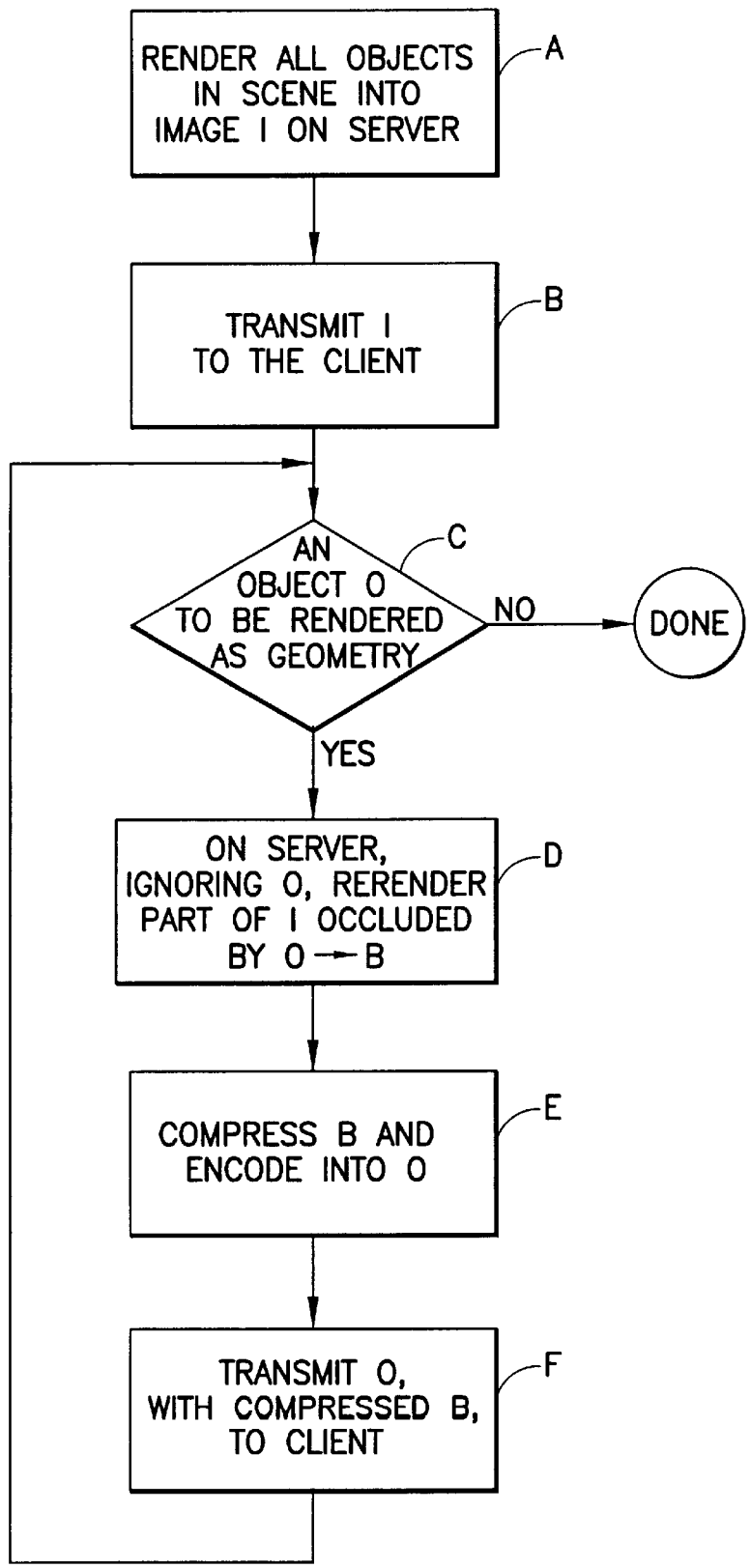
FIGS. 11 and 12 are each a logic flow diagram illustrating a method for implementing the background image embedding procedure in the context of transmitting a 3D scene from a server to a client.

One advantage of the second technique, shown in FIG. 12, over the first technique shown in FIG. 11, is that background information may be embedded more efficiently when two or more objects cover the same image pixels. In such a case the first technique (FIG. 11) requires that the pixel attributes are compressed and encoded into all objects covering the corresponding pixels. In the second technique, however, any such multiply-covered pixels are encoded only once. However, the use of the second technique in this case may require a longer time to construct, compress, and embed the background image, which results in a correspondingly longer delay between the receipt of the rendered image and the display on the client of the first 3D object.

An important consideration when sampling occluded regions is the quality of the image recovered from the samples as the occluding object moves. Since the number of samples to be embedded into an object is limited by the amount of unused space in the embedding target associated with that object, the samples are preferably selected so as to maximize the image quality upon reconstruction. Adaptive sampling techniques that use fewer samples in regions with low intensity variations, and more samples in regions with a significant amount of detail, are preferred for this purpose. In addition, the samples themselves may be compressed, so as to reduce the amount of storage they require and, hence, allow for a larger number of samples to be collected.

To further demonstrate the process of embedding image content into geometric objects, a presently preferred sample implementation is described. The results obtained with this sample implementation are illustrated in the context of the exemplary scene shown in FIG. 2A.

Before sampling, the portion of the image to be sampled is preprocessed to identify regions of high intensity variation that will require higher sampling, as well as areas that are relatively uniform and thus, will require fewer samples. The preprocessing phase is comprised of three steps, as follows.

(1) Masking

If the region to be sampled is not a square with a side equal to a number of pixels that is a power of two, then a mask for the sampling region is computed as follows. First, the smallest bounding square with an area that is a power of two in the number of pixels it covers is computed. This defines the extent of the mask, M. Next, construct a bitmap representation of M, where all bits inside M that are also inside the sampling region are set to 1, while the remaining bits are set to 0. FIG. 3(A) shows the mask computed for the region behind the teapot that is to be sampled in FIG. 2A.

(2) Edge Detection

Figures 3C, 4A, 4B, 4C:

In this second step the area of interest in the image is segmented to identify meaningful details. A presently preferred technique employs an edge detection algorithm using Sobel operators, see Gonzalez et al, Digital Image Processing, Addison-Wesley, 1992, that are applied to compute a gradient image. The masks used for the Sobel operators are shown in FIG. 3C. Other edge detection filters (besides Sobel operators) can also be used to practice this invention.

(3) Thresholding

The image that results after the previous step is segmented further in order to eliminate some of the low frequency variations of the background intensity. A simple global thresholding scheme is applied, such as one also disclosed by Gonzalez et al., which labels all pixels that have an intensity lower than a preset threshold as background pixels, and sets their intensity to zero. FIG. 3B shows the result of applying Steps 2 and 3 to the portion of the image behind the teapot.

A presently preferred, but not limiting, technique for sampling the image uses a quadtree-based approach, such as one described by Foley et. al., "Computer Graphics: Principles and Practice", Addison-Wesley, 1992. The construction of the quadtree is regulated by the structure of the preprocessed image, and is described next. The preprocessed region is first considered as a whole. If the standard deviation from the mean of the pixel intensities in the preprocessed image is sufficiently small (no edges have been detected), then the original image is considered uniform and the quadtree-building process stops at this point. If, however, the deviation from the mean is not smaller than a preset tolerance, then the image is divided into four quadrants and the same process is applied to each quadrant. For sampling purposes, the resulting quadtree is superimposed over the original image, and a sample is computed as the average of the intensities of all pixels that fall inside a quadtree leaf. According to this approach, the number of samples is equal to the number of leaves in the quadtree.

Since the number of samples that can be encoded is limited to the unused space budget in the embedding target, in the presently preferred embodiment the quadtree building algorithm is modified so as to always proceed first with the subdivision of the quadrant with the largest deviation from the mean. Note that no subdivision is applied to quadtree nodes that lie completely outside the sampling region mask, and the standard deviation is weighted by the quadtree cell size to ensure that no regions are oversampled while others are excessively undersampled. At the end of the sampling procedure, each sample corresponding to a quadtree leaf is characterized by the average intensity value of the pixels in the region it represents.

Since storing a Red-Green-Blue (RGB) triplet for each quadtree leaf is space consuming, it is preferred to apply a color compression scheme to reduce the amount of storage necessary for the samples. For example, first the sample colors are converted to a color-index representation, in which each sample is characterized by a single integer representing the index of that color into a color table. Next, the size of the color table is reduced, such as by averaging together colors that are similar (the difference in their intensities does not exceed a given threshold).

Another suitable color compression technique could be used as well, and the teaching of this invention is thus not limited for use only with the technique just described.

Figure 8:
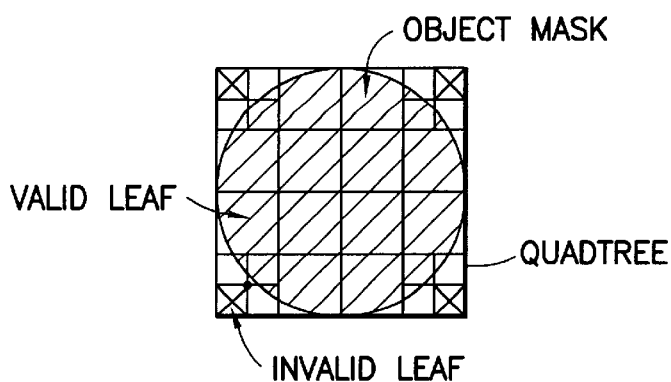
FIG. 8 depicts a valid leaf for a quadtree, and is also useful in understanding the method associated with FIGS. 7A–7C.

To encode the quadtree, it is preferred to employ a quadtree descriptor that uses four bits per internal node and five bits per leaf node to describe whether the four quadrants (i.e., children) of a node are further subdivided or not, and to indicate whether a leaf node is inside the sampling region or not. Referring also to FIG. 8, a leaf node is considered to be inside the sampling region if there is an overlap between it and the sampling region mask. A bit with the value 0 means that the corresponding child node is a leaf in the quadtree, whereas a bit value of 1 signifies that the corresponding child node is further subdivided. The total number of bits necessary to store the quadtree descriptor depends on the height of the quadtree, and is bounded by the number:

$$nbits=(4^n-1)/3+4^{n-1},$$

which is the number of internal nodes plus twice the number of leaves in the quadtree.

In general, for internal nodes the quadtree descriptor contains a single bit, namely a '1', indicating that this quadtree node is an internal node and is subdivided further.

For leaf nodes, the quadtree descriptor contains two bits, namely one bit to indicate that it is a leaf node ('0') and the valid bit.

Therefore, for a given number of levels in the quadtree, the size of the quadtree is bounded by the maximum number of internal nodes (1 bit each) plus the maximum number of leaves (2 bits each).

Figure 2A:
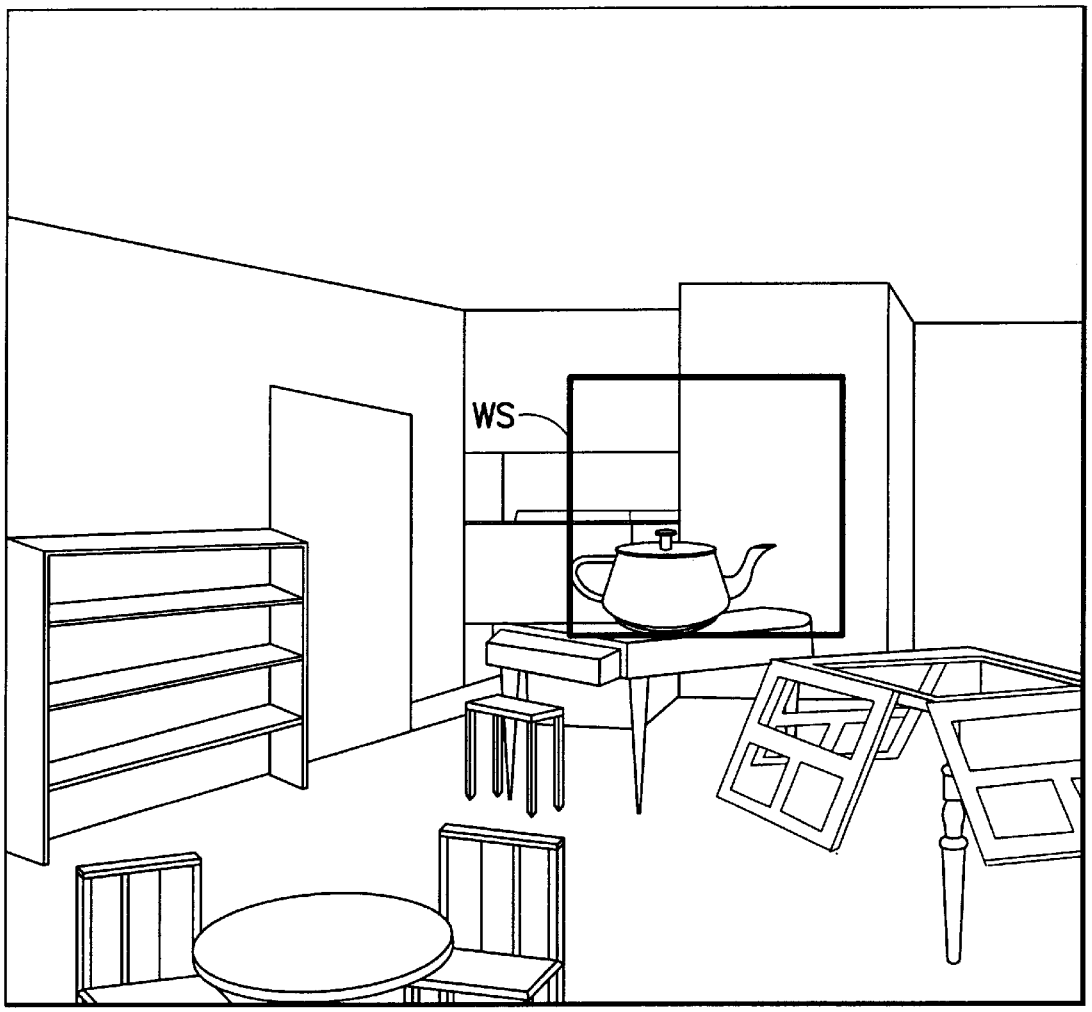
FIG. 2A is an exemplary scene of a room with a teapot. The white square (WS) outlines a 128×128 pixel area that will be used, in accordance with the teaching of this invention, to process and to encode the region of the image hidden by the teapot into the teapot geometry.

In accordance with the teachings of this invention the quadtree descriptor, the colors for all the quadtree leaves, and the color table are the data to be embedded into the geometric object of interest (in this example, the teapot of FIG. 2A). The actual embedding target is selected to be the indices of the vertices as they appear in the indexed face list representation of the teapot.

Assuming that there are less than $2^{15}-1$ vertices, one can readily observe that the MSB (sign bit) of the regular vertex indices is always zero. In the presently preferred embodiment the background image is encoded in vertex indices 0 . . . 127; each of the nine unused significant bits of an index less than 128 are employed to encode one byte of information of the background image; and the sign bit (MSB) is employed as a flag to indicate that the associated vertex index contains embedded information concerning the underlying image background.

In practice, first the quadtree descriptor is encoded and is stored in two parts, (a) the number of bits in the quadtree descriptor, (b) followed by the descriptor itself. If the descriptor contains more than 8 bits, it is spread in segments of 8 bits across several vertex indices (see FIG. 4D). Next the color table itself is stored. To store the color table, one or more bytes are used to indicate its size, and three bytes are used for each RGB triplet that follows. Finally, the color indices for all leaves in the quadtree are stored.

FIG. 4 shows an example of how an image is encoded into a number of vertex indices. For the quadtree in FIG. 4A the quadtree descriptor is shown in FIG. 4C, along with the other information to be encoded. The quadtree descriptor is 1 0001 111 0000 1111. The first bit (MSB) indicates that the region is to be subdivided into four quadrants. The next four bits indicate that quadrants 0, 1, and 2 (using the notations in FIG. 4B) are not subdivided further, while quadrant 3 is. The next three bits indicate that the first level leaves overlap with the mask. The next 4 bits (all zero in this case) indicate that the quadrants (sub-quadrants) of quadrant 3 are not subdivided any further. Finally, the last four bits indicate that the sub-quadrants of quadrant 3 all have common portions with the mask. The color in each quadtree leaf is shown as an index into the color map. Each color component in the color map is stored as a number between 0 and 255. For the sake of brevity, only one color component is shown for each entry. In general, however, each color has three components (red, green, and blue). FIG. 4D illustrates how the samples and the information associated with the samples are actually encoded into the vertex indices.

In the various techniques described above both the size of the quadtree and the size of the color table determine the quality of the compressed image. Increasing the size of the quadtree provides improved spatial resolution in the compressed image, while increasing the size of the color table provides improved color resolution. If the size of the compressed image is fixed, e.g., by the available number of vertex indices available to store the compressed image, the size of the quadtree and the size of the color map should be appropriately balanced.

One simple approach is to limit the size of the color table to, for example, 256 entries so that all entries in the color map can be addressed with one byte. The quadtree resolution is then chosen such that it fits into the remaining storage area.

Another approach that is computationally more expensive minimizes the pixel error of the compressed image compared to the original background while not exceeding a predefined maximal size of the compressed image. Such an optimization problem can be solved using any standard optimization scheme (see, for example, Sofer et al., Linear and Nonlinear Programming, McGraw Hill, 1996.)

Figure 2B:
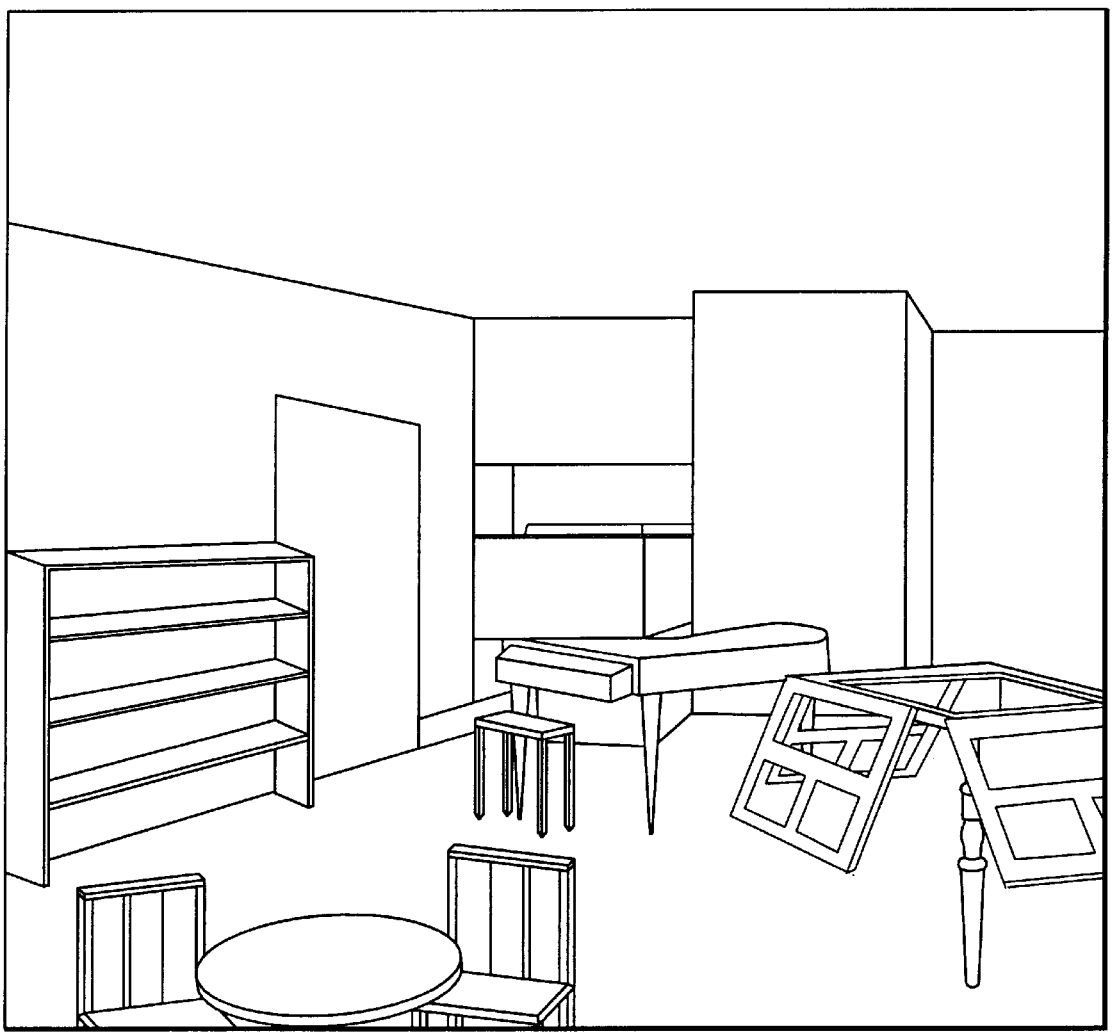
FIG. 2B illustrates the scene of FIG. 2A without the teapot, showing the content of the image hidden by the teapot that has been retrieved from the information encoded into the teapot geometry.

Further in accordance with the teaching of this invention, before an object that carries embedded background information is rendered, the encoded data that is descriptive of the background image is first stripped or extracted from the object. To extract the encoded information from the 3D object, the mask of the object is first computed and the attributes of the pixels covered by the mask are restored in the order in which they were encoded. The background image is then reconstructed in its entirety from the encoded data and stored for access when object manipulations reveal part of the background (see, for example, FIG. 2B, 5A and 5B).

Figure 5A:
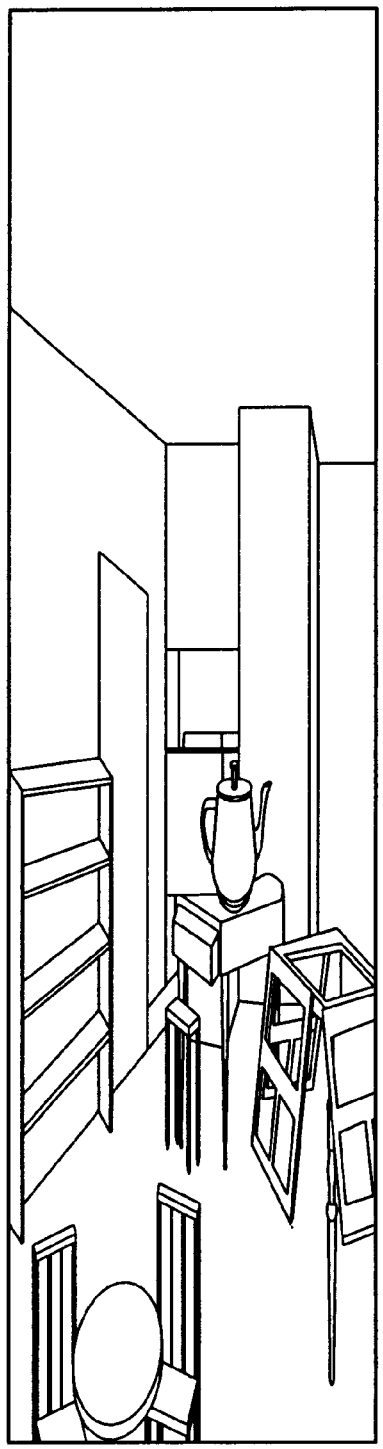
FIGS. 5A and 5B illustrates the scene from FIG. 2A rotated around its vertical axis, wherein in FIG. 5B the teapot object is rendered as a polygonal 3D object.
Figure 5B:
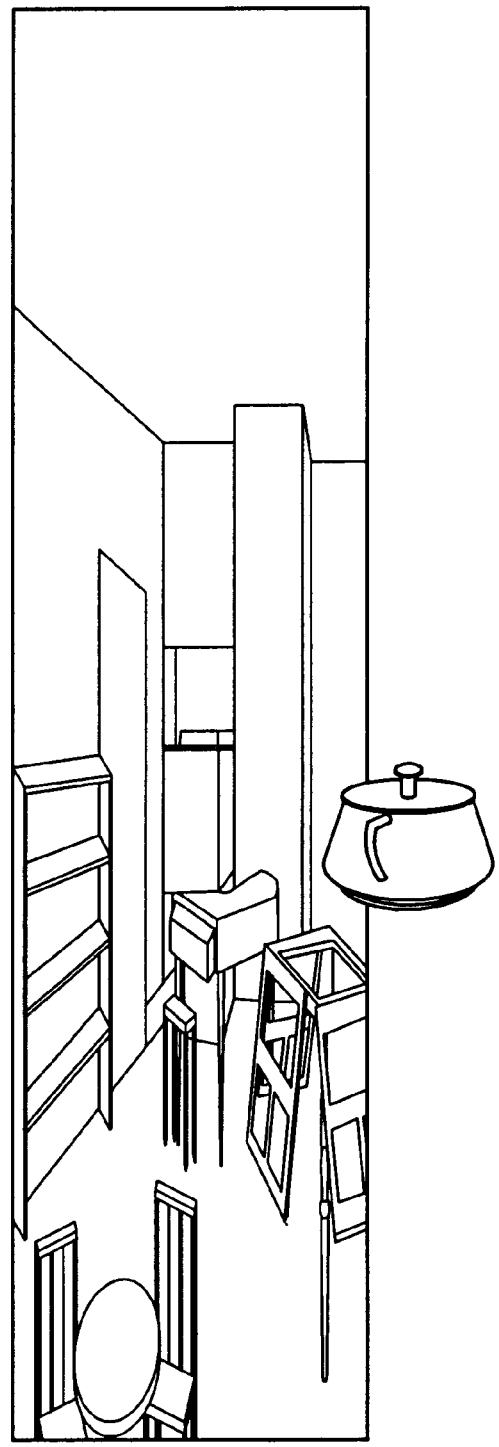

More particularly, FIG. 5A illustrates the scene from FIG. 2A rotated around its vertical axis, and illustrates the two dimensional nature of the scene (note that the teapot is part of the image.) FIG. 5B illustrates the scene with the teapot rendered as geometry, and the rest of the scene as an image. This scene is also rotated around its vertical axis to illustrate the combination of the three dimensional object and the two dimensional image.

Figure 7A:
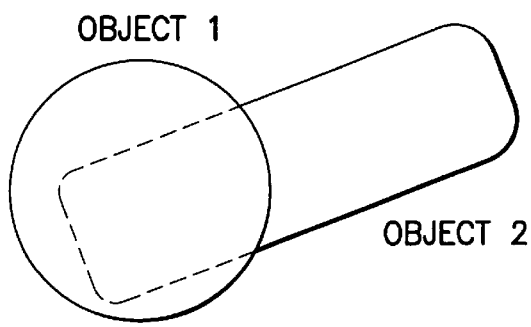
FIGS. 7A–7C are diagrams useful in understanding a method of this invention that avoids a presence of seams when a plurality of quadtrees do not match exactly.
Figure 7B:
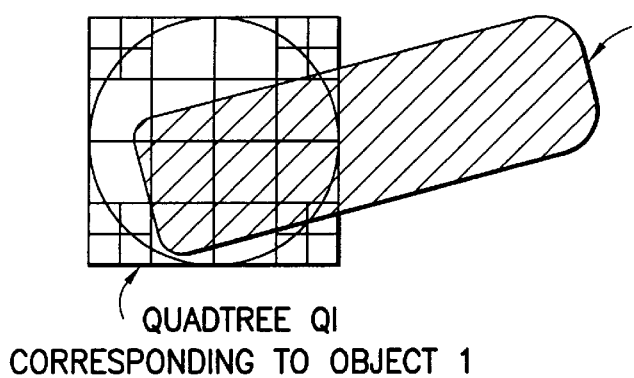
Figure 7C:
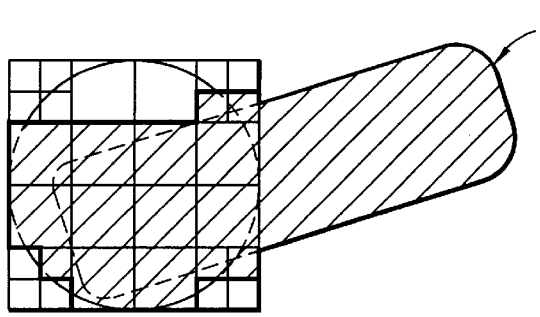

Further in accordance with an aspect of this invention, if several objects to be rendered as geometry cover overlapping regions of the background, seams in the reconstructed image may appear if the corresponding quadtrees do not match exactly. To avoid this problem, and referring to FIGS. 7A–7C, for each region to be sampled behind an object O the method computes an enlarged mask M1 that includes the original object mask M and all the quadtree cells intersected by M that belong to quadtrees corresponding to geometric objects that project onto the same region. A presently preferred technique for computing the enlarged mask is as follows.

```
M1 = M
For each quadtree Q corresponding to an object that
occludes 0 do
    For each valid leaf L in Q do
        If L intersects M then
            M1 = Union (M1, L)
        Endif
    Endfor
Endfor
```

For retrieving image data when several objects to be rendered as geometry cover overlapping regions of the background, an enlarged mask identical to the one used for encoding is computed. For this purpose, the quadtree descriptors of all quadtrees corresponding to geometric objects that project onto the overlapping regions are stored.

It should be noted that for a given quadtree, and referring to FIG. 8, a valid leaf is a leaf that intersects the mask of the object associated with the quadtree, as described above.

It should be noted that the foregoing teachings have been described in the context of polygonal data structures comprised of vertices, edges, etc. However, based on these teachings those skilled in the art may recognize how to extend these teachings to other geometric object representations, including freeform surfaces such as patches and splines, and may then further recognize how to encode the underlying scene image data into the data structures of the objects represented as, by example, patches or splines. However, any and all such modifications are deemed to fall within the ambit of the teaching of this invention.

Furthermore, the teachings of this invention are not to be construed to be limited to only the specific examples of sampling techniques and data representations and formats that were described above.

It should also be realized that this invention is directed as well to a computer program embodied on a computer-readable medium for providing a technique to avoid an occurrence of an occlusion error in a digital data processing system of a type that includes a display. The computer program includes an encoder code segment for encoding a specification of a two dimensional background image into at least one three dimensional foreground object that overlies and occludes a portion of the background image. The computer program further includes a display code segment for displaying to a viewer the background image and the at least one overlying foreground object and, in response to a movement of the foreground object that makes a portion of the background image visible to the viewer, for displaying the portion of the background image that has become visible by using the encoded specification that is extracted from the foreground object. This computer program could reside on one computer, or could reside on two or more computers such that, and by example, the encoder code segment executes on a first computer (e.g., the server) while the display code segment operates on a second computer (e.g., the client).

Thus, while the invention has been particularly shown and described with respect to preferred embodiments thereof, it will be understood by those skilled in the art that changes in form and details may be made therein without departing from the scope and spirit of the invention.

What is claimed is:

1. A method for avoiding an occurrence of an occlusion error in a digital data processing system that comprises a display, comprising steps of:
    encoding a specification of a two dimensional background image into at least one three dimensional foreground object that overlies and occludes a portion of the background image;
    displaying to a viewer the background image and the at least one overlying foreground object; and
    in response to a movement of the foreground object that makes a portion of the background image visible to the viewer, displaying the portion of the background image that has become visible, the step of displaying using the encoded specification that is retrieved from the foreground object.

2. A method as in claim 1, wherein the three dimensional foreground object is defined using polygons, each having vertices, edges and faces.

3. A method as in claim 1, and comprising an initial step of transmitting from a first node to at least one second node the two dimensional background image and a two dimensional representation of the at least one foreground object, and then subsequently transmitting from the first node to the at least one second node the at least one three dimensional foreground object containing the encoded specification.

4. A method as in claim 1, wherein the step of encoding occurs at a first data processor, and where the steps of displaying occur at a second data processor.

5. A method as in claim 4, wherein the step of encoding includes a step of transmitting data from the first data processor to the second data processor, the transmitted data comprising at least the at least one three dimensional foreground object having the encoded specification of the two dimensional background image.

6. A method as in claim 5, wherein there are a plurality of three dimensional foreground objects, wherein the step of encoding comprises an initial step of transmitting first data from the first data processor to the second data processor, the first data comprising the two dimensional background image as well as a two dimensional representation of the plurality of three dimensional foreground objects, and the step of encoding then further comprising steps of encoding, in turn, the specification of the two dimensional background image into an individual one of the three dimensional foreground objects that overlies and occludes a portion of the background image, and transmitting second data from the first data processor to the second data processor, the second data comprising the individual one of the three dimensional foreground objects having the encoded specification of the two dimensional background image.

7. A method as in claim 5, wherein there are a plurality of three dimensional foreground objects, wherein the step of encoding comprises an initial step of transmitting first data from the first data processor to the second data processor, the first data comprising the two dimensional background image as well as a two dimensional representation of the plurality of three dimensional foreground objects, and the step of encoding then further comprising steps of encoding the specification of the two dimensional background image into all of the plurality of three dimensional foreground objects that overlie and occlude a portion of the background image, and transmitting second data from the first data processor to the second data processor, the second data comprising the all of the plurality of three dimensional foreground objects having the encoded specification of the two dimensional background image.

8. A method as in claim 1, wherein the step of encoding encodes data from the background image that is comprised of color data that is descriptive of occluded pixels.

9. A method as in claim 1, wherein the step of encoding encodes data from the background image that is comprised of color data and depth data that is descriptive of occluded pixels.

10. A method as in claim 1, wherein the step of encoding comprises steps of:
sampling the two dimensional background image behind the three dimensional foreground object to obtain sampled image data; and
storing the sampled image data into a data structure that is descriptive of the three dimensional foreground object.

11. A method as in claim 1, wherein the step of encoding comprises steps of:
applying a mask to the two dimensional background image and sampling the two dimensional background image within the mask to obtain sampled image data, the mask having a shape that corresponds to a shape of a projection of the three dimensional foreground object; and
storing the sampled image data into unused portions of a data structure that is descriptive of the three dimensional foreground object.

12. A method as in claim 11, wherein the three dimensional foreground object is defined using polygons, each having vertices, edges and faces, and wherein the data structure is comprised of a list of indexed vertices.

13. A method as in claim 12, wherein one byte of a multi-byte vertex index is used to store sampled image data, and wherein a logical state of a sign bit is used to indicate that the associated vertex index stores sampled image data.

14. A method as in claim 10, wherein the step of sampling uses a quadtree structure comprised of cells divisible into further cells.

15. A method as in claim 10, wherein the data structure stores a color table, and wherein the sampled image data is comprised of indices into the color table.

16. A method as in claim 15, wherein the color table has a length that is limited to some predetermined number of entries to reduce storage requirements.

17. A method as in claim 1, wherein the step of displaying the background image and the at least one overlying foreground object comprises preliminary steps of:
stripping the encoded specification from the foreground object and rendering the two dimensional background image in its entirety;
storing the rendered background image; and
in response to the movement of the foreground object that makes the portion of the background image visible to a viewer, the step of displaying the portion of the background image that has become visible first accesses the stored background image to retrieve that portion of the background image that has become visible.

18. A method as in claim 17, wherein the step of stripping the encoded specification comprises the steps of:
extracting information that is embedded in the object;
constructing a mask containing at least the pixels covered by the projection of the object; and
building a background image using the information extracted from the object.

19. A method as in claim 18, wherein the embedded information comprises a color map and a quadtree descriptor comprising color indices into the color map.

20. A method as in claim 18, wherein the step of constructing a mask further comprises steps of:
applying the mask to the two dimensional background image; and
sampling the two dimensional background image within the mask under the control of a quadtree structure to obtain sampled image data.

21. A method as in claim 1, wherein the step of encoding comprises steps of:
applying a mask to the two dimensional background image;
sampling the two dimensional background image within the mask under the control of a quadtree structure to obtain sampled image data; wherein
the mask has a shape that corresponds to a shape of a first object mask M and also all quadtree cells, that project onto M, and that are associated with quadtrees corresponding to other three dimensional foreground objects that also project onto the same region of the two dimensional background image; and
storing the sampled image data into unused portions of a data structure that is descriptive of the three dimensional foreground object.

22. A system comprising at least one digital data processing system that includes a display and circuitry for rendering data to be viewed on said display, further comprising:
an encoder for encoding a specification of a two dimensional background image and for storing the encoded specification into a data structure that is descriptive of at least one three dimensional foreground object that overlies and occludes a portion of the background image;

said display displaying to a viewer the background image and the at least one overlying foreground object; and a controller that operates in response to a movement of the foreground object, said movement making a portion of the background image visible to the viewer, for displaying the portion of the background image that has become visible by using the encoded specification that was stored into the data structure that is descriptive of the foreground object.

23. A system as in claim 22, wherein the three dimensional foreground object is defined using polygons, each having vertices, edges and faces.

24. A system as in claim 22, wherein the system is located at a first node and wherein said controller is initially operable for transmitting to at least one second node the two dimensional background image and a two dimensional representation of the at least one foreground object, and then subsequently transmitting to the at least one second node the at least one three dimensional foreground object containing the encoded specification.

25. A system as in claim 22, and further comprising at least one further digital data processing system, wherein said encoder is located at one data digital data processing system, and wherein said display and said controller are located at said at least one further digital data processing system.

26. A system as in claim 25, and further comprising a data communications network that couples said digital data processing systems together for transmitting data descriptive of the least one three dimensional foreground object having the stored, encoded specification of the two dimensional background image from said one data digital data processing system to said at least one further digital data processing system.

27. A system as in claim 22, wherein said encoder encodes data from the background image that is comprised of color data that is descriptive of occluded pixels.

28. A system as in claim 22, wherein said encoder encodes data from the background image that is comprised of color data and depth data that is descriptive of occluded pixels.

29. A system as in claim 22, wherein said encoder is comprised of an image sampler for sampling the two dimensional background image behind the three dimensional foreground object to obtain sampled image data; and wherein the sampled image data is stored into a data structure that is descriptive of the three dimensional foreground object.

30. A system as in claim 22, wherein said encoder is comprised of an image sampler that applies a mask to the two dimensional background image and samples the two dimensional background image within the mask to obtain sampled image data, the mask having a shape that corresponds to a shape of a projection of the three dimensional foreground object; and wherein the sampled image data is stored into a data structure that is descriptive of the three dimensional foreground object.

31. A system as in claim 30, wherein the three dimensional foreground object is defined using polygons, each having vertices, edges and faces, and wherein the data structure is comprised of a list of indexed vertices, wherein one byte of a multi-byte vertex index is used to store sampled image data, and wherein a logical state of a sign bit is used to indicate that the associated vertex index stores sampled image data.

32. A system as in claim 29, wherein said sampler operates using a quadtree structure comprised of cells divisible into further cells.

33. A system as in claim 29, wherein said data structure stores a color table, and wherein said sampled image data is comprised of indices into the color table.

34. A system as in claim 22, wherein said controller is operative to first extract the encoded specification from the foreground object, to then render the two dimensional background image in its entirety, and to store the rendered background image such that, in response to a movement of the foreground object that makes a portion of the background image visible to a viewer, the controller can access and retrieve that portion of the stored background image that has become visible.

35. A system as in claim 22, wherein said encoder operates to apply a mask to the two dimensional background image and to sample the two dimensional background image within the mask under the control of quadtree structure to obtain sampled image data; wherein the mask has a shape that corresponds to a shape of a first object mask M and also all quadtree cells, that project onto M, and that are associated with quadtrees corresponding to other three dimensional foreground objects that also project onto the same region of the two dimensional background image; and is further operative to store the sampled image data into unused portions of a data structure that is descriptive of the three dimensional foreground object.

36. A computer program embodied on a computer-readable medium for providing a technique to avoid an occurrence of an occlusion error in a digital data processing system that comprises a display, comprising:

an encoder code segment for encoding a specification of a two dimensional background image into at least one three dimensional foreground object that overlies and occludes a portion of the background image; and a display code segment for displaying to a viewer the background image and the at least one overlying foreground object and, in response to a movement of the foreground object that makes a portion of the background image visible to the viewer, for displaying the portion of the background image that has become visible by using the encoded specification that is extracted from the foreground object.

37. A method for avoiding an occurrence of an occlusion error in a digital data processing system that comprises a display, comprising steps of:

encoding a specification of a two dimensional background image into at least one three dimensional foreground object that overlies and occludes a portion of the background image, the step of encoding comprising steps of sampling the two dimensional background image behind the three dimensional foreground object to obtain sampled image data and storing the sampled image data into a data structure that is descriptive of the three dimensional foreground object;

displaying to a viewer the background image and the at least one overlying foreground object; and in response to a movement of the foreground object that makes a portion of the background image visible to the viewer, displaying the portion of the background image that has become visible, the step of displaying using the encoded specification that is retrieved from the foreground object; wherein the step of sampling employs a quadtree descriptor that uses n bits per internal node and m bits per leaf node to describe whether the quadrants of a given node are further subdivided or not, and to indicate whether a leaf node is within a sampling region or not, wherein a total number of bits necessary to store the quadtree descriptor is a function of the height of the quadtree.

38. A method as in claim 37, wherein n=4 and m=5.

39. A method as in claim 37, wherein the quadtree descriptor comprises one bit for indicating that a particular quadtree node is an internal node and is subdivided further, and, for a leaf node, the quadtree descriptor comprises two bits, one bit for indicating that the node is a leaf node and the other for indicating validity.

40. A method for transmitting image data from a server to a client, comprising steps of:

compressing a representation of a portion of a two dimensional background image that is hidden behind a three dimensional foreground object;

storing the compressed representation into a data structure that is descriptive of the three dimensional foreground object;

transmitting a representation of the background image and the data structure from the server to the client;

at the client, displaying the background image and the foreground object; and at the client, in response to a movement of the foreground object that makes the hidden portion of the background image become visible, displaying the portion of the background image that has become visible, the step of displaying using the compressed representation that was stored into the data structure.

41. A method for transmitting image data from a server to a client, comprising steps of:

transmitting a two dimensional representation of a visible portion of a background image and a two dimensional representation of a three dimensional foreground object from the server to the client;

at the client, displaying the two dimensional representation of the visible portion of the background image and the two dimensional representation of a three dimensional foreground object;

at the server, compressing a representation of a hidden portion of the two dimensional background image that is behind the three dimensional foreground object and storing the compressed representation into a data structure that is descriptive of the three dimensional foreground object;

transmitting the data structure from the server to the client;

at the client, updating the display by replacing the displayed two dimensional representation of the foreground object with three dimensional representation of the foreground object; and at the client, in response to a movement of the foreground object that makes the hidden portion of the background image become visible, displaying, using the compressed representation that was stored into the data structure, the portion of the background image that has become visible.

42. A method as in claim 41, wherein the step of updating is comprised of preliminary steps of:

extracting the compressed representation from the data structure that is descriptive of the three dimensional foreground object; and storing the extracted compressed representation for use during the step of displaying the portion of the background image that has become visible.

\* \* \* \* \*